(12) United States Patent  (10) Patent No.: US 8,191,906 B2
Jensen  (45) Date of Patent: Jun. 5, 2012

(54) MODULAR UTILITY STAND STORAGE APPARATUS AND METHOD

(76) Inventor: Steven Michael Jensen, St. Paul, MN (US)

( * ) Notice: Subject to any disclaimer, the term of this patent is extended or adjusted under 35 U.S.C. 154(b) by 709 days.

(21) Appl. No.: 11/352,722

(22) Filed: Feb. 13, 2006

(65) Prior Publication Data

US 2007/0187929 A1  Aug. 16, 2007

(51) Int. Cl.
  *B62B 1/04*  (2006.01)
(52) U.S. Cl. .................... 280/30; 280/47.18; 280/47.28
(58) Field of Classification Search .................. 280/30, 280/33.998, 47.131, 47.17, 47.18, 47.2, 47.27, 280/47.28, 79.11, 79.3; 220/4.27; 211/194; 206/503–513; 108/11, 48, 148, 144.11, 146, 108/147.11, 147.16–147.19, 147.21, 147.22; 312/249.9–249.12
  See application file for complete search history.

(56) References Cited

U.S. PATENT DOCUMENTS

| | | | | |
|---|---|---|---|---|
| 1,700,203 A * | 1/1929 | Baker | ........................... | 312/195 |
| 2,233,003 A * | 2/1941 | Epps | ........................... | 312/195 |
| 2,670,964 A * | 3/1954 | Chalmers | ................... | 280/47.18 |
| 2,893,577 A * | 7/1959 | Swanson | ........................ | 414/446 |
| 3,771,848 A * | 11/1973 | Claywell | ........................ | 312/237 |
| 4,235,449 A * | 11/1980 | Tarran | .............................. | 280/30 |
| 4,253,546 A * | 3/1981 | Uchida | ............................. | 182/20 |
| 4,660,905 A * | 4/1987 | Conner et al. | ................. | 312/195 |
| 4,865,339 A * | 9/1989 | Rundborg et al. | .......... | 280/47.21 |
| 4,934,718 A * | 6/1990 | Voegele | ............................ | 280/30 |
| 5,092,615 A * | 3/1992 | Gregalis | ........................... | 280/30 |
| 5,147,120 A * | 9/1992 | Ray | ................................... | 312/111 |
| 5,201,536 A * | 4/1993 | Bono et al. | ....................... | 280/30 |
| 5,224,531 A * | 7/1993 | Blohm | ............................ | 144/285 |
| 5,476,282 A * | 12/1995 | Dahl | ............................... | 280/651 |
| 5,518,258 A * | 5/1996 | Cox | .................................. | 280/30 |
| 5,642,895 A * | 7/1997 | Wunder | ............................ | 280/30 |
| 5,653,457 A * | 8/1997 | Marmer et al. | .................. | 280/30 |
| 6,047,750 A * | 4/2000 | Jensen | ......................... | 144/286.1 |
| 6,053,587 A * | 4/2000 | Boerder | .................... | 312/249.12 |
| 6,698,361 B2 * | 3/2004 | Lung | ........................... | 108/50.17 |
| 6,736,073 B2 * | 5/2004 | Ryburg | ............................ | 108/42 |
| 6,880,835 B2 * | 4/2005 | Tornabene et al. | ............. | 280/30 |
| 6,948,724 B2 * | 9/2005 | Davis | .............................. | 280/30 |
| 6,983,946 B2 * | 1/2006 | Sullivan et al. | ............ | 280/79.11 |
| 7,093,840 B2 * | 8/2006 | Lucas et al. | ..................... | 280/30 |
| 7,331,596 B2 * | 2/2008 | Tiramani et al. | .............. | 280/643 |
| 2001/0045718 A1 * | 11/2001 | Boirum | ....................... | 280/47.26 |
| 2004/0164653 A1 * | 8/2004 | Winkless | ....................... | 312/107 |

* cited by examiner

*Primary Examiner* — Katy M Ebner
(74) *Attorney, Agent, or Firm* — Dorsey & Whitney LLP

(57) ABSTRACT

A modular utility stand storage apparatus includes a plurality of components for storage/transport and utility stand operation. The storage components are stacked on top of one another in a utility stand mode. The apparatus also includes a platform which can serve as a working platform or a hand truck for transport of the various components. The stacked utility stand storage apparatus provides various working heights and the individual storage compartments are easily lifted and portable.

9 Claims, 5 Drawing Sheets

MODULAR UTILITY STAND STORAGE APPARATUS AND METHOD

FIELD OF INVENTION

The present invention relates in general to a stackable, and adjustable utility stand apparatus, more particularly to a stackable, portable, and adjustable combination of a utility stand and a storage unit, and further more particularly to a stackable, portable, and adjustable combination of a modular utility stand and a storage unit.

BACKGROUND OF THE INVENTION

Working tools, such as miter saws, are widely used in carpentry due to their ability to make precise cuts in a variety of materials very quickly. Transporting of these tools becomes easier due to their compact design. Portable table saws are also very popular for much of the same reasons, However, their portable design leaves the tool with a very small platform (bed) in which to secure the work to be cut, which requires the operator to supply supplemental work supports to safely and accurately cut the work. Existing art includes a large variety of options in which to elevate a tool to a comfortable height with work supports, However, these prior art devices are tool specific and are bulky to store when not in use.

U.S. Pat. Nos. 5,462,102, 4,860,807, 5,320,150, 4,874,025, 5,497,816, and 4,974,651 describe various saw tables that have addressed the problem of lifting and supporting a saw off the ground with an adjustable stock support to rest work pieces on in order to safely cut them. The problems that are not addressed in these patents are: (1) the ability to accommodate other bench top tools that would benefit from a table with stock supports, (2) limited or lack of storage space for other tools, and (3) the inherently bulky features of utility/table stands in storage/transport mode.

Another aspect of carpentry is the large quantity of tools required. There has been virtually always a need to store, organize, and transport these tools, in combination with a portable work bench. Various attempts have been made to design a work bench that is portable and has a tool storage capacity. U.S. Pat. Nos. 5,224,531, 4,953,601, 3,771,848, and 3,118,685 describe various designs to store, organize, and transport a large assortment of tools. A problem exists in these patents with the size of a tool chest. In order to be a work bench that is of a sufficient work height, the tool chest sacrifices portability. Conversely, if the tool chest is of a size that can easily be loaded into a vehicle, the tool chest sacrifices the height that would be comfortable to work on as a work bench.

It can be seen that there is a need for an improved utility stand storage unit which has a comfortable working height as well as being modular, portable, and adjustable. There is also a need for such a utility stand storage unit to be easily set up with a modular design.

SUMMARY OF THE INVENTION

To overcome the limitations in the prior art described above, and to overcome other limitations that will become apparent upon reading and understanding the present specifications, the present invention provides a utility stand storage unit. The unit is stackable, modular to be portable, adjustable, and suitable for various working heights. The present invention also provides a plurality of modular utility stand storage units. The modular utility stand storage units can be assembled together to form a large working platform.

In one embodiment according to the present invention, the utility stand storage unit includes a plurality of individual components, wherein the components may have at least one storage space. The individual components are detachable for movement with a wheeled handle. When in the use mode, the handle can be used as legs to support one end of a platform with the other end of the platform supported by a stacked set of components. Vertical slots for attachment and horizontal adjustment of a platform are situated on individual components side. Longitudinal slots in the legs allow for horizontal adjustment of platform on leg side.

Further in one embodiment, the platform may be detached from components; next, placing the platform and wheels onto floor, and extending the legs upward for handle use, a wheeled dolly results.

In another embodiment according to the present invention, a plurality of towers made up of stacked storage units can be arranged and configured to be linked to each other by the platforms. The dimension of each modular utility stand storage unit allows the platforms to be disposed in longitudinal or perpendicular positions.

Further in one embodiment according to the present invention, each of the components include at least one drawer, housed in a frame with vertical slots to allow for adjustable attachment of a platform. The slots of the components are in alignment when stacked. The platform is attached to the slots of the stacked components and may be supported by its leg(s) or the slots of another set of stacked components. The height of the platform can be adjusted either by adjusting the length of its leg(s) or by adjusting the height of the connection point to the storage unit components.

In addition to the above discussed features and advantages of the present invention, several other features and advantages of the present invention are:

(a) it provides a utility stand (or tool stand) which is capable of accommodating several different bench top tools;

(b) it provides a utility stand which is capable of storing and organizing other tools in which the operator requires in day to day operations;

(c) it provides a utility stand that can be attached and used in conjunction with other utility stands of the similar type to expand and enhance the utility station in the work station mode (or use mode) of operation;

(d) it provides a utility stand that is also a portable tool chest that can easily be loaded into a vehicle;

(e) it provides a utility stand that reduces the amount of space taken up from small tool boxes and saw stands when storing;

(f) it provides a utility stand that assists the activity that can benefit from a portable storage container with the ability to transform into a table and further have a height adjustment in the table sufficient to satisfy many applications, such as a computer desk, etc.;

(g) it provides a utility stand simple in design for manufacture;

(h) it provides a utility stand that simplifies vehicle packing plans; and (i) it provides a utility stand that reduces the number of trips to and from a vehicle when unloading and/or loading equipment.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE PREFERRED EMBODIMENT

In the following description of the exemplary embodiment, reference is made to the accompanying drawings which form a part thereof, and in which is shown by way of illustration the specific embodiment in which the invention may be practiced. It is to be understood that other embodiments may be utilized as structural or implementing changes may be made without departing from the scope of the present invention.

The present invention provides a utility stand storage unit. The unit is stackable modular to be portable, adjustable, and suitable for various working heights. The present invention also provides a plurality of modular utility stand storage units. The modular utility stand storage units can be arranged and configured to form multiple working platform utility stands.

Configurations for carpentry are used to teach the functionality of the subject invention. The following examples are a sample of the many applications and configurations that are possible.

Figure 1:
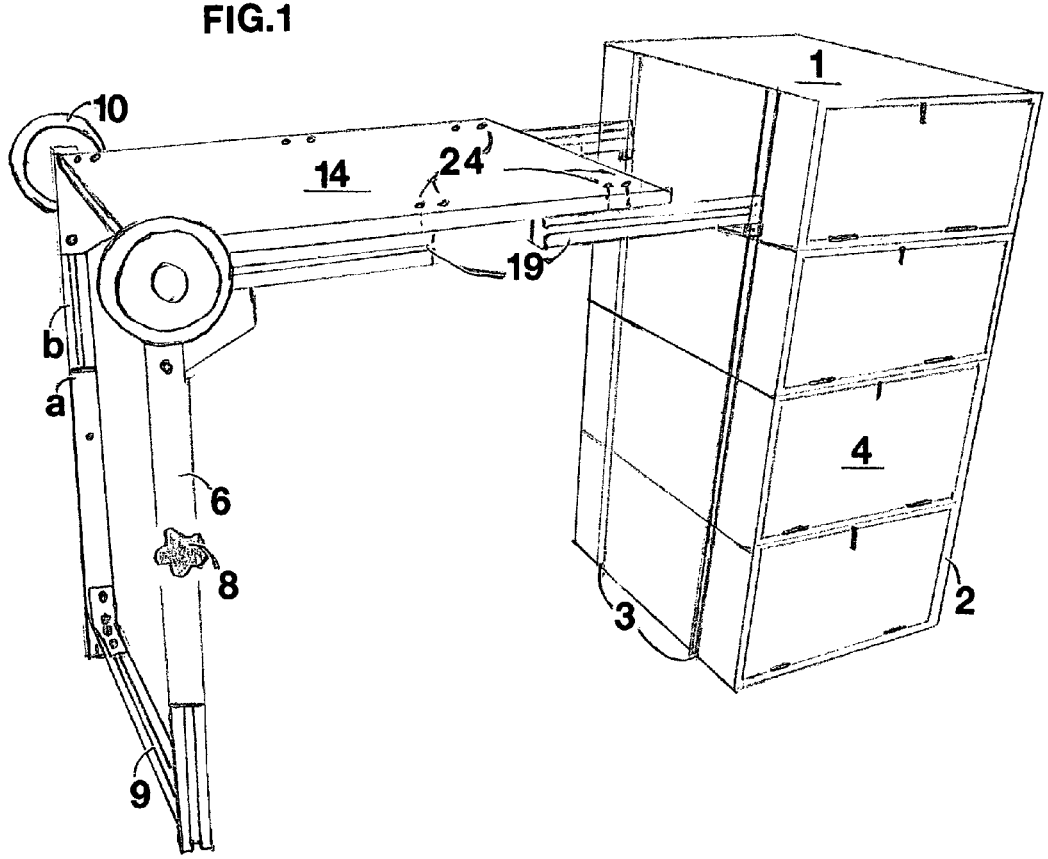
FIG. 1 shows a perspective view of a modular utility stand storage unit in a work station mode in accordance with the principles of the present invention.
Figure 4:
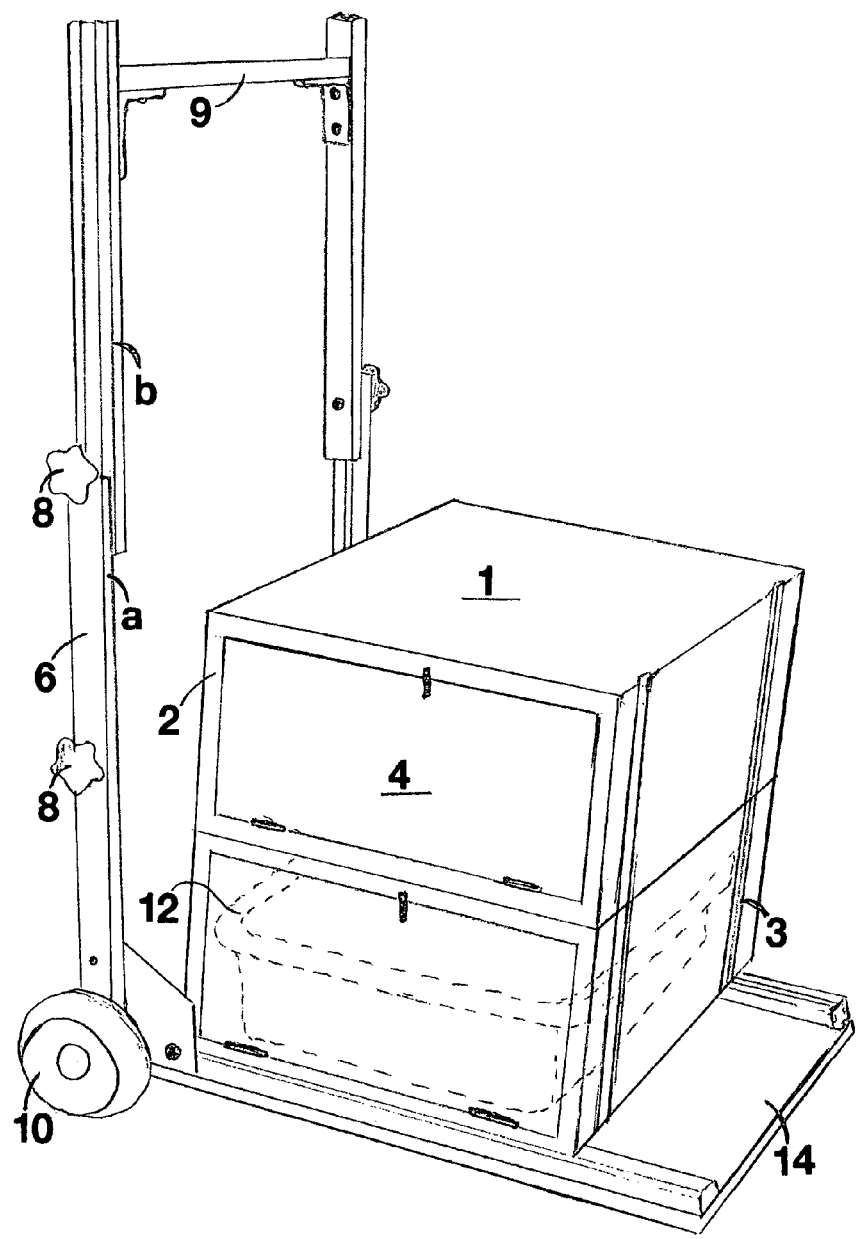
FIG. 4 shows a perspective view of the modular utility stand storage unit in transport mode in accordance with the principles of the present invention.
Figure 5:
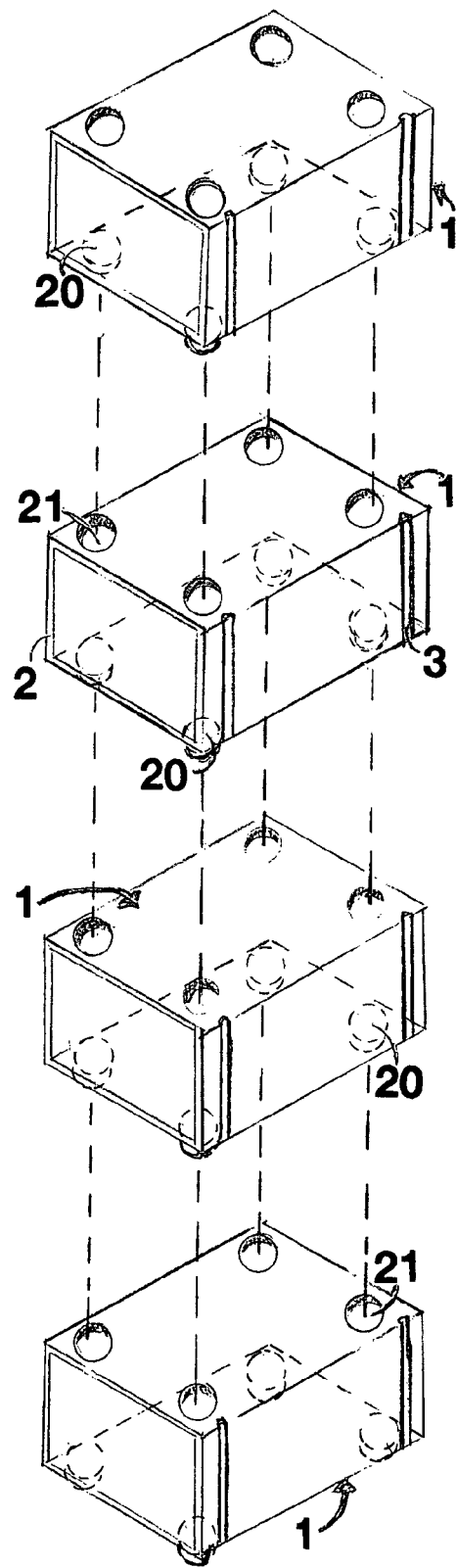
FIG. 5 shows an exploded view of the modular utility stand storage units in accordance with the principles of the present invention.

Referring now more particularly to the drawings, FIG. 5 shows an exploded view of four modular storage units 1 according to the present invention. The modular storage unit 1 includes a frame 2, lineal tracks 3, short legs 20, sockets 21. Additionally the modular storage unit 1 in FIG. 4 shows the door 4 and tray 12. Frame 2 provides housing for one or more trays 12, and lineal exterior attachment of track 3. Door 4 is located on either end of frame 2 providing access to contents of frame 2. Short legs 20 on bottom of frame 2 slightly elevate frame 2 off ground and mate with sockets 21, located on top of frame 2, when multiple frames 2 are stacked on top of one another. FIG. 1 shows stacked modular storage units 1 in conjunction with table 14 to form the modular utility stand storage apparatus. Attachment means of table 14 to stacked modular storage units 1 allows for lineal or perpendicular attachment of table 14 to stacked modular storage units 1. Additionally table 14 is slidably adjustable along track 3 for height adjustment of table 14. Further in FIG. 1 table 14 utilizes extension bar 19 to lengthen table. Extension bar 19 is located on the bottom of table. Extension bar 19 is projected out from the table by loosening bolts 24 at the top of table 14 that project through table 14 into extension bar 19. Adjustable leg assembly 6 supports half of table 14 opposite stacked modular storage units 1. Leg assembly 6 can be shortened or lengthened by loosening hand turn lock nut 8; the two bars a & b of leg assembly 6 can then longitudinally slide, tightening hand turn lock nut 8 after desired height is achieved locks leg assembly 6 in place.

Figure 3:
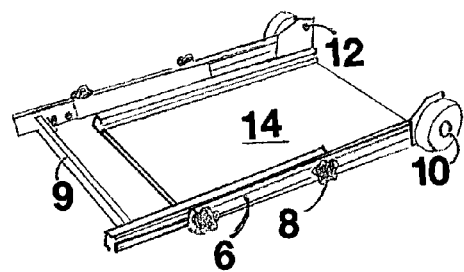
FIG. 3 shows a perspective view of the handle/leg and table configuration in storage mode in accordance with the principles of the present invention.
Figure 2:
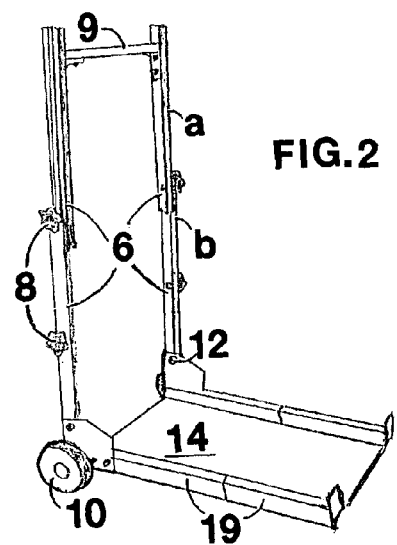
FIG. 2 shows a perspective view of the handle/leg and inverted table configuration in transport mode in accordance with the principles of the present invention.

FIG. 2 shows table 14 detached from modular storage units 1. The top of table 14 is placed onto the ground thus rotating it 90 degrees from its position in FIG. 1. The leg assembly 6 in FIG. 2 is extending upward with crossbar 9 providing a handle for distributing equal load to each leg 6; in this position, with wheel set 10 on the ground, a hand truck configuration can be utilized to carry large tools or modular storage units 1 as shown in FIG. 4. FIG. 3 shows leg assembly 6 folded down parallel to table 4; pulling pin 12 allows leg assembly 6 to pivot perpendicular or parallel to table 14.

Figure 6:
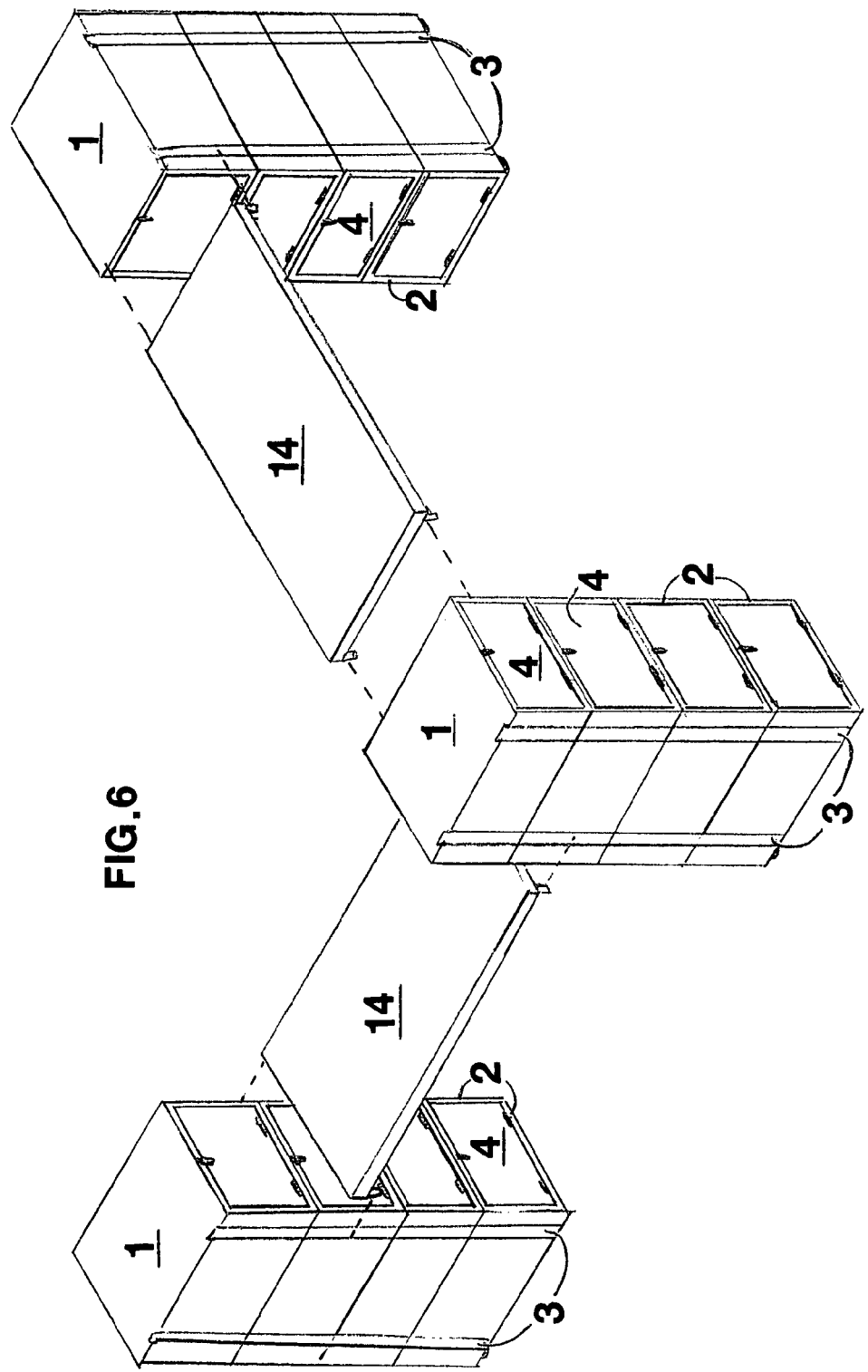
FIG. 6 shows a perspective view of one exemplary arrangement of multiple modular utility stand storage units for an expanded work station mode of operation.

FIG. 6 shows multiple towers of stacked storage units 1 with tables 14 positioned lineally or perpendicular to stacked storage units 1.

The foregoing description of the exemplary embodiment and operation of the invention has been presented for the purposes of illustration and description. The foregoing description is not intended to be exhaustive or to limit the invention to the precise form disclosed. Many modifications and variations are possible in light of the above teaching. For example, the modular utility stand storage unit(s) can be used for computer work station(s) or office table(s), etc. It is intended that the scope of the invention be limited not with this detailed description but rather by the claims appended hereto.

What is claimed is:

1. A modular utility stand storage apparatus, comprising:
    a plurality of stackable compatible storage compartment frames;
    at least one track formed in and along at least one side of each of said frames;
    a dual purpose platform for engagement with a bottom surface of said frames for transporting said frame;
    an engagement mechanism on said platform for slidable engagement along said at least one track on each of said frames to transform said platform to an elevated working surface, said platform is movable perpendicularly relative to said frames as said engagement mechanism slides along said at least one track to adjust the position of said platform at any position along said track;
    a leg assembly having at least one adjustable dual functioning leg that provides support on one end of said work surface in a work mode, and provides a leveraged handle in transport mode, wherein the leg assembly includes a wheel set disposed at a joint section of the leg assembly and the platform;
    a first member on each of said adjustable dual functioning legs;
    a second member on each of said adjustable dual function legs that is adjustable to said first member to adjust the length of said adjustable dual function leg; and
    a locking mechanism to lock said first member and said second member relative to one another; wherein each of said adjustable dual function legs can be perpendicularly adjusted as said engagement mechanism slides along said at least one track to maintain said platform surface in a plane perpendicular to said frames and said locking mechanism locks said first member and said member to maintain said platform at a selected height.

2. The modular utility stand storage apparatus according to claim 1, wherein one or more of said storage compartment frames are stacked together to support a first side of said platform at a desired height.

3. The modular utility stand storage apparatus according to claim 2, wherein a second stacked set of said storage compartment frames support a second side of said platform with respect to said first side.

4. The modular utility stand storage apparatus according to claim 1, wherein the wheel set includes a pulling pin which allows the leg assembly to pivot between a perpendicular position and a parallel position in relation to the platform.

5. The modular utility stand storage apparatus according to claim 1, said apparatus further including:
    at least one storage drawer housed in said storage compartment frames.

6. A modular utility stand storage apparatus comprising:
    a work surface;
    a leg assembly having at least one adjustable dual functioning leg that provide support on one end of said work surface in a work mode, and provide a leveraged handle in transport mode, wherein the leg assembly includes a wheel set disposed at a joint section of the leg assembly and the work surface;
    a first member on each of said adjustable dual functioning legs;
    a second member on each of said adjustable dual function legs that is adjustable to said first member to adjust the length of said adjustable dual function leg;
    a locking mechanism to lock said first member and said second member relative to one another; and
    one or more modular storage compartment frames stackably compatible with one another that provide support for said work surface opposite said at least one leg adjusted at a desired height wherein each of said adjustable dual function legs can be perpendicularly adjustable to a desired height and said locking mechanism locks said first member said member to maintain said work surface at a selected height.

7. The modular utility stand storage apparatus according to claim 6, wherein the wheel set is removably connected between the leg assembly and the work surface, and includes a pulling pin which allows the leg assembly to pivot between a perpendicular position and a parallel position in relation to the work surface.

8. The modular utility stand storage apparatus according to claim 7, wherein said work surface is utilized as a hand truck by setting said work surface and said wheels on the ground and allowing said legs to project upward to provide a handle for hand truck operation.

9. The modular utility stand storage apparatus according to claim 6 wherein said storage compartment frames include:
    tracks formed on one side of each of said at least one storage compartment frames; and
    an engagement mechanism for securing said work surface to at least one of said tracks for sliding vertical adjustment of said work surface.

\* \* \* \* \*